United States Patent [19]

Utsumi

[11] Patent Number: 4,799,772
[45] Date of Patent: Jan. 24, 1989

[54] UNIAXIALLY HIGH-ORIENTED POLYETHYLENE NAPHTHALATE FILM FOR LIQUID CRYSTAL PANEL SUBSTRATES

[75] Inventor: Shigeo Utsumi, Yokohama, Japan

[73] Assignee: Diafoil Company, Limited, Tokyo, Japan

[21] Appl. No.: 936,311

[22] Filed: Dec. 1, 1986

[30] Foreign Application Priority Data

Dec. 9, 1985 [JP] Japan ................................ 60-276647

[51] Int. Cl.$^4$ .......................... G02F 1/13; B32B 7/02; B32B 29/00
[52] U.S. Cl. ................................ 350/339 R; 350/334; 350/337
[58] Field of Search .................... 350/337, 334, 339 R; 428/215, 333

[56] References Cited

U.S. PATENT DOCUMENTS 4,166,876 9/1979 Chiba et al. .................... 428/215
4,234,654 11/1980 Yatabe et al. .................... 428/333
4,561,724 12/1985 Otaki et al. ...................... 350/334

FOREIGN PATENT DOCUMENTS

| | | | |
|---|---|---|---|
| 0089493 | 9/1983 | European Pat. Off. ............ | 350/337 |
| 0017531 | 1/1984 | Japan .................. | 350/334 |
| 59-88719 | 5/1984 | Japan . | |
| 59-189117 | 10/1984 | Japan . | |
| 60-97323 | 5/1985 | Japan . | |
| 60-162222 | 8/1985 | Japan . | |
| 60-162223 | 8/1985 | Japan . | |
| 59-95513 | 8/1985 | Japan . | |

*Primary Examiner*—John S. Heyman
*Assistant Examiner*—Huy K. Mai
*Attorney, Agent, or Firm*—Oblon, Fisher, Spivak, McClelland & Maier

[57] ABSTRACT

Disclosed herein is a uniaxially high-oriented polyethylene naphthalate film for liquid crystal panel substrate which has an in-plane birefringence of more than 0.110 after the film is stretched and subjected to heatset treatment.

7 Claims, No Drawings

UNIAXIALLY HIGH-ORIENTED POLYETHYLENE NAPHTHALATE FILM FOR LIQUID CRYSTAL PANEL SUBSTRATES

BACKGROUND OF THE INVENTION

The present invention relates to a uniaxially high-oriented polyethylene naphthalate film for liquid crystal panel substrates and, in particular, to a film suitable for a cell of a flexible liquid crystal panel. More particularly, the present invention relates to a polyethylene naphthalate film useful as a cell of a flexible liquid crystal panel, which is stretched uniaxially with high orientation, and has an in-plane birefringence of more than 0.110 after the film is stretched and subjected to heatset treatment.

Uniaxially stretched polyethylene terephthalate films having good mechanical properties, electrical properties, heat resistance and chemical resistance, have conventionally been used as cells of liquid crystal panels. A uniaxially stretched polyethylene terephthalate film, however, has been found to have various defects as the film has increasingly been used for wide purposes, and an improvement has been demanded.

For example, when a uniaxially stretched polyethylene terephthalate film is used in place of a glass substrate for a liquid crystal panel, it is difficult to completely orient in one direction, thereby having a problem in terms of extinction, and since the heat resistance thereof is low, it is impossible to raise the temperature when manufacturing the film. Such a uniaxially stretched polyethylene terephthalate film also involves a critical defect; when the film is exposed to a high temperature, for example, when a transparent electrode is formed by vacuum evaporation, an oligomer educes, thereby deteriorating the transparency of the film, disconnecting the lead wire of the transparent electrode, or increasing the resistance of the lead wire thereof. If the orientation of one direction is increased to improve the loss of the extinction, the film is likely to be torn in the orientation direction, thereby enhancing notched effect and extremely reducing the manufacturing yield.

In place of such polyethylene terephthalate films, polyethylene naphthalate films have been proposed. For example, Japanese Patent Laying-Open (KOKAI) No. 50-45877 (1975) discloses a biaxially oriented polyethylene 2,6-naphthalate-film having a Young's modulus in the longitudinal direction of not less than 51,000 kg/cm², and a Young's modulus in the transverse direction of not less than 68,000 kg/cm², and which is useful as an electrical insulating material, a base material for magnetic recording tape. Japanese Patent Publication No. 56-19012 (1981) discloses a magnetic recording tape comprising a magnetic layer formed on the surface of a biaxially oriented polyethylene-2,6-naphthalate film which has a Young's modulus in the longitudinal direction of not less than 51,000 kg/cm² and a Young's modulus in the transverse direction of not less than 68,000 kg/cm². Japanese Patent Publication No. 48-29541 (1973) discloses a method of manufacturing a magnetic recording tape having a large tensile strength in the longitudinal direction and a good dimensional stability comprising a biaxially stretched polyethylene naphthalate film and a mixture of magnetic particles and a binder coated on the surface thereof.

However, no suggestion has ever been made as to the use of a uniaxially stretched polyethylene naphthalate film as a liquid crystal panel substrate.

It is an object of the present invention to provide a film for liquid crystal panel substrates which is superior in weather resistance, tear strength and heat resistance to a stretched polyethylene terephthalate film and, which produces no education (bleeding) of a low-molecular weight polymer such as an oligomer.

As a result of researches on how to achieve this aim, the present inventor has found that it is very difficult to obtain a film having the above-described properties by using a polyethylene terephthalate film but it is enabled by using a polyethylene naphthalate film which is uniaxially highly oriented more than a predetermined value, and the present invention has been achieved on the basis of this finding.

SUMMARY OF THE INVENTION

In an aspect of the present invention, there is provided a uniaxially high-oriented polyethylene naphthalate film for liquid crystal panel substrates having an in-plane birefringence of more than 0.110 after the film is stretched and subjected to heatset treatment.

DESCRIPTION OF THE PREFERRED EMBODIMENT

A polyethylene naphthalate used in the present invention represents a polymer constructed substantially ethylene-2,6-naphthalate as a constitutional unit and also includes an ethylene-2,6-naphthalate polymer modified with a third component in small amount of, for example, not more than 10 mol%, preferably not more than 5 mol%. Polyethylene naphthalate is generally produced by polycondensating naphthalene-2,6-dicarboxylic acid or a functional derivative thereof, for example, dimethylnaphthalene-2,6-dicarboxylate with ethylene glycol in the presence of a catalyst under an appropriated reaction condition. As a third component, dicarboxylic acid such as adipic acid, sebacic acid, phthalic acid, isophthalic acid, terephthalic acid, naphthalene-2,7-dicarboxylic acid, and a lower alkyl ester thereof; hydroxycarboxylic acid such as p-hydroxybenzoic acid and a lower alkyl ester thereof; and dihydric alcohol such as propylene glycol, trimethylene glycol, tetramethylene glycol, pentamethylene glycol and hexamethylene glycol may be exemplified.

The intrinsic viscosity of the polyethylene naphthalate used in the present invention is preferably at least 0.40, preferably 0.45 to 0.90, because the polyethylene naphthalate is poor in mechanical properties in the case where a polymerization degree is too low. [The method of measurement of intrinsic viscosity: 1 g of polyethylene naphthalate tip or film is added to 100 ml of phenol/1,1,2,2-tetrachloroethane (50/50 by weight) solution and the mixture is heated at 140° C. for 30 min., thereby dissolving the polyethylene naphthalate tip or film, and thereafter, an intrinsic viscosity is measured at 30.0° C.]

A film according to the present invention must have an in-plane birefringence of more than 0.110, preferably not less than 0.12, more preferably not less than 0.13, after the film is stretched and subjected to heatset treatment. If the in-plane birefringence of the film is less than 0.110, when it is used for a liquid crystal panel, since the extinction is deteriorated, such a polyethylene naphthalate film is inferior to a polyethylene terephthalate film.

When polyethylene terephthalate is used as a polarizing plate, since it is likely to be torn in the direction of stretching, a film having an in-plane birefringence of less than 0.110 has been proposed. However, it has been unexpectedly proved that if a polyethylene-2,6-naphthalate film is used, even if the in-plane birefringence thereof is more than 0.110, it is difficult to tear. It is therefore possible to increase the in-plane birefringence while maintaining the tear strength substantially the same as that of a polyethylene terephthalate film. That is, a polyethylene-2,6-naphthalate film can improve the loss of the extinction of a polyethylene terephthalate film to a great extent.

It is necessary that the heat-shrinkage ratio both in the longitudinal and transverse directions of a film according to the present invention measured at 150° C. for 30 minutes is not greater than 2 %. If the heat-shrinkage ratio is more than 2 %, the film is shrunk when forming a conductive film, thereby deteriorating the flatness. In order to reduce the heat-shrinkage ratio, the film is subjected to relaxation in the longitudinal and/or transverse direction when it is stretched and subjected to heatset treatment, or the film is further subjected to heat treatment under a low tension after it has been rolled. It is also preferable to subject the film to heat treatment at a high temperature in order to reduce the heat-shrinkage ratio. A stretched polyethylene terephthalate film is difficult to subject to heat treatment at a high temperature because the haze is increased and the film is likely to be torn if the film is subjected to heatset treatment at too high. It is advantageously possible, however, to subject a polyethylene naphthalate film to heatset treatment at a higher temperature, and the heatset treatment temperature is preferably 00 to 270° C.

Since a film according to the present invention must have transparency, it is necessary that the film haze is not more than 5 % per with respect to a film of 100 μm in thickness. For this reason, the film of the present invention contains substantially no particles and, if any, it is necessary to limit the content of the particles to a certain extent which does not impair the rolling operability.

The thickness of a polyethylene naphthalate film of the present film is not specified, but the thickness of the film used usually is 10 to 250 μm.

A process for producing a film according to the present invention will now be explained, but the present invention is not limited thereto.

A polyethylene naphthalate polymer as a raw material is dried and extruded into a sheet form by an extruder ordinarily at a temperature of from 280 to 320° C. The extruded sheet is brought into contact with a cooling roll to be rapidly cooled and hardened, and is then uniaxially stretched and subjected to heatset treatment. When the molten polyethylene naphthalate sheet is brought into contact with the cooling roll, an electrostatic cooling method is preferably adopted so as to produce a film of good thickness accuracy at a high speed. Since it is difficult to apply the electrostatic cooling method to a polyethylene naphthalate which has a large resistivity in the molten state, it is preferable to use a polyethylene naphthalate which has a resistivity in the molten state of not more than $5\times10^8$ Ω·cm. The thus obtained sheet is then stretched by a roll in the longitudinal direction and hardly stretched in the transverse direction to obtain a longitudinally high-oriented film. Alternatively, the thus obtained sheet may hardly be stretched in the longitudinal direction and stretched in the transverse direction with high draw ratio to obtain a transversely high-oriented film. A longitudinally high-oriented film of the uniaxially high-oriented films of the present invention is a film obtained by stretching a sheet in the longitudinal direction to 3 to 7 times and then in the transverse direction to less than 2.0 times. If the sheet is stretched in the longitudinal direction to less than 3 times or in the transverse direction to more than 2 times, it is impossible to highly orient the film in the longitudinal direction. A transversely high-oriented film of the uniaxially high-oriented films of the present invention is a film obtained by stretching a sheet in the longitudinal direction to less than the yield point and then in the transverse direction to more than 3.5 times. The thus stretched film in this way is subjected to heat-set treatment by an ordinary tentering method or another known method. It is preferable to take the step of subjecting the film to relaxation at the maximum heatset temperature. It is also preferable to subject the film to heat treatment under a low tension at a high temperature when it has been rolled after heatsetting.

A uniaxially high-oriented polyethylene naphthalate film of the present invention obtained in the above-described has a much higher heat resistance than a polyethylene terephthalate film, produces no bloom of a low-molecular weight substance such as an oligomer, is efficient in weather resistance, tear strength and degree of polarization.

Since the uniaxially high-oriented polyethylene naphthalate film according to the present invention is excellent in clearness and brightness, it is suitable as a film for large-size indicating liquid crystal cells and curved surface indicating liquid crystal cells. The cell of liquid crystal panels of the film according to the present invention is used for various indicating such as watches, electronic calculators, toys, meter panels of motor cars, television, terminal indicator of computer, instrumentation devices, etc.

The liquid crystal indicating cell prepared by using the uniaxially high-oriented polyethylene naphthalate film according to the present invention is explained as follows, however, the present invention is not limited thereto.

The liquid crystal indicating cell of the present invention comprises polarizing membranes, polyethylene naphthalate films, transparent electrode patterns, a sealing material, a liquid crystal layer and a reflecting plate or a scattering plate, wherein the transparent electrode is provided on the opposing surface of the polyethylene naphthalate films, at least one of the transparent electrodes is patternized by letters and/or drawings, the liquid crystal is enclosed between the two polyethylene naphthalate films by the sealing material, the polarizing membrane is provided on the other surface of each polyethylene naphthalate film so as to sandwich the two polyethylene naphthalate films having the transparent electrodes, and the reflecting plate or the scattering plate is provided on the surface of one of the polarizing membranes.

Although it is preferable that the acting mode of the liquid crystal is twisted nematic type, it may be guest-host type or kinematic scattering type. Although the polarizing membrane is not particularly limited, for instance, the polarizing membrane comprising a uniaxially stretched film of polyvinyl alcohol to which a dyestuff of iodine compound or a dichroic dyestuff has been adsorbed, etc., and the polarizing membrane is provided on the non-opposing surface of the polyethylene naphthalate film. It is preferable that the polarizing membrane is sticked on the polyethylene naphthalate film so that the absorbing axis of the polarizing membrane is parallel or intersect perpendicularly to the main orienting-direction of the polyethylene naphthalate film.

The two polarizing membranes are generally disposed so that the absorbing axis of one of them is parallel or intersect perpendicularly to the absorbing axis of the other of them. The polyethylene naphthalate film and the polarizing membrane may be preliminarily laminated. The reflecting plate or a scattering plate is disposed on the outside of one of the polarizing membranes.

The present invention will be explained in more detail hereinunder with reference to the following example, but the following example is for purpose of illustration only and is not intended as a definition of the limits of the invention. The physical properties were measured in the following way.

(1) Heat-shrinkage ratio

A test piece of 300 mm × 15 mm was formed by cutting out of a film along the main axis thereof and in the orthogonal direction thereto, respectively. The test piece was suspended with one end clamped in a circular hot air oven which was held at 150° C., and heat treated for 30 minutes. The longitudinal dimensions of the test piece before and after the heat treatment were measured and the heat-shrinkage ratio was calculated from the following formula:

$$\text{Heat-shrinkage ratio} = \left[ \frac{\text{(length before the heat treatment} - \text{length after the heat treatment)}}{\text{length before the heat treatment}} \right] \times 100 \, (\%).$$

(2) In-plane birefringence

The retardation was measured by a polarizing microscope produced by Karlzeis Ltd., and the in-plane birefringence ($\Delta n$) was obtained from the following formula:

$$(\Delta n) = R/d$$

wherein R represents retardation and d the thickness of the film.

(3) Film haze

The film haze was obtained by an integrating sphere type of digital turbidimeter NDH-20D made by Nihon Denshoku Kogyo Ltd. according to ASTM-D-1003.

If the thickness of the film is $d(\mu)$, the measured value of the film haze is $H_1$, and the measured value of the haze after liquid paraffin is coated on the surface of the film is $H_2$, the film haze of a film of 100 $\mu$ in thickness was defined by the following formula.

$$H = H_2 \times \frac{100}{d} + H_1 - H_2$$

(4) The increasing rate of the film haze

The increasing rate of the film haze is represented by the ratio of the value of the haze of the surface of the film after it was heat-treated at 150° C. for 30 minutes to the value of the haze of the surface of the film before the heat treatment.

(5) Deflection in the transverse direction of the extinction angle

If the angle between the main axis and the orthogonal direction of the in-plane refringence was $\theta$, the difference between the maximum value and the minimum value of $\theta$ in a film of 1 m in width was defined as the deflection of in the transverse direction of the extinction angle.

(6) Mechanical Properties

The breaking strength ($F_B$: kg/mm$^2$) and the breaking extension ($E_B$: %) were obtained by an ordinary method by using Tensilon produced by Toyo Boldwin Ltd.

(7) Evaluation of the performance as the liquid crystal cell

A liquid crystal indicating cell having an indicating surface of 1.5 cm in length and 6 cm in width by using two polyethylene naphthalate films and transparent electrodes, a twisted nematic liquid crystal, two polarizing membranes, and a reflecting plate is prepared.

(i) The indicating surface was observed with naked eye from the front and from the oblique direction of 10°, whereby the performance of the product was observed. The method of judging is as follows.

Excellent: Coloration is not observed at all when seen from the front and from the oblique direction.

Good: Coloration is not observed when seen from the front and coloration is observed little when seen from the oblique direction, in total without any practical problem.

Poor: Coloration is not observed when seen from the front and coloration is observed a little when seen from the oblique direction, in total without any practical problem.

Bad: Strong colored pattern is observed when seen from the front and from the oblique direction.

(ii) An occurance of a crack of the liquid crystal indicating cell by bending is observed. The method of judging is as follows.

Good: No crack.
Bad: Be cracked easily.

EXAMPLE

Preparation of Polyethylene Naphthalate 100 parts of dimethyl naphthalate-2,6-dicarboxylate 60 parts of ethylene glycol and 0.1 part of hydrous calcium acetate are charged into a reactor to carry out transesterification. The reaction initiating temperature was 180° C., and the reaction temperature was gradually raised with the distillation of methanol, until the temperature reached 230° C. after 4 hours, when the transesterification was substantially completed.

After 0.04 part of phosphoric acid was added to the reaction mixture, 0.04 part of antimony trioxide was added thereto to carry out polycondensation by an ordinary method in which the temperature was gradually raised and the pressure was gradually reduced from ordinary pressure, until the temperature reached 290° C. and the pressure 0.3 mm Hg after 2 hours.

When 4 hours from the initiation of the reaction, the reaction was stopped and polyethylene naphthalate was discharged in a pressurized a nitrogen.

The intrinsic viscosity of the thus obtained polyethylene naphthalate was 0.63, and the resistivity thereof in the molten state was $1.2 \times 10^8$ Ω·cm.

Production of a Polyethylene Naphthalate Film

The thus-obtained polyester was extruded at 295° C. by an extruder into a sheet form, and an amorphous sheet was formed by using an electrostatic cooling method. The condition for electrostatic application was as follows.

The electrostatic charging was performed by applying a DC voltage of about 9 kV to the positive electrode, which is a tungsten wire of 0.1 mm in diameter, stretched over the rotating drum in the direction perpendicular to the flow of the sheet.

The thus obtained amorphous film was stretched in the longitudinal direction to 1.2 times and in the transverse direction to 4.2 times, and thereafter it was subjected to heatset treatment at 240° C. for 10 seconds. Further, in a zone at a temperature of 240° C., the thus obtained film was subjected to relaxation in the transverse direction by 7 %. This film was subjected to heat treatment at 170° C. for 7 seconds under a tension of 60 g/mm² in a hot-air oven conveying by a roll conveyor, whereby a transversely uniaxially stretched film was obtained.

COMPARATIVE EXAMPLE

A transversely uniaxially stretched polyethylene terephthalate film which is generally used now was used as Comparative Example.

The physical properties of the films of Example and Comparative Example are shown in Table 1.

TABLE 1

|  |  | Example | Comparative Example |
|---|---|---|---|
| In-plane Birefringence |  | 0.135 | 0.095 |
| Heat-Shrinkage Ratio | Longitudinal Direction | 0.1 | 1.9 |
|  | Transverse Direction | 0 | 1.2 |
| Film haze with respect to a film of 100 μm |  | 1.0 | 0.9 |
| Increasing ratio of film haze |  | 1.01 | 1.9 |
| Deflection in the transverse direction of the extinction angle |  | ±1° | ±3° |
| Mechanical Properties | $F_B$ (kg/mm²) Longitudinal Direction | 15.0 | 8.0 |

TABLE 1-continued

|  |  | Example | Comparative Example |
|---|---|---|---|
|  | Transverse Direction | 25.0 | 22.0 |
| $E_B$ (%) | Longitudinal Direction | 35 | 5 |
|  | Transverse Direction | 100 | 120 |
| Evaluation of liquid crystal cell | Coloration | Excellent | Poor |
|  | Crack | Good | Bad |

As is clear from Table 1, by using a polyethylene naphthalate film, the loss in the transverse direction of the extinction can be reduced and the heat-shrinkage ratio and mechanical properties can be improved, and a film which does not contaminate the surface of the film by education (bleeding) of an oligomer during heat treatment and which is much superior to a polyethylene terephthalate film as a film for liquid crystal panels.

What is claimed is:

1. A uniaxially highly-oriented polyethylene naphthalate film useful for liquid crystal panel substrates, having an in-plane birefringence of more than 0.110 after said film is stretched and subjected to a heatset treatment ranging from 200° to 270° C.

2. The film according to claim 1, wherein the heat-shrinkage ratio in the longitudinal direction and the transverse direction of said film measured after said film is subjected to heat at 150° C. for 30 minutes is not more than 2%.

3. The film according to claim 1, wherein the haze of said film is not more than 5% with respect to a film of 100 μm in thickness.

4. The film according to claim 1, wherein the thickness of said film is 10 to 250 μm.

5. The film according to claim 1, which has an in-plane birefringence of not less than 0.120.

6. The film according to claim 1, wherein said film is oriented in the longitudinal direction of the film by stretching the sheet from which the film is prepared in the longitudinal direction thereof by a factor of 3-7 times and then in the transverse direction by a factor of less than 2.0 times.

7. The film according to claim 1, wherein said highly oriented film is oriented in the transverse direction of the film by stretching the sheet from which the film is prepared in the longitudinal direction thereof by a factor less than the yield point and then in the transverse direction by a factor more than 3.5 times.

* * * * *